UNITED STATES PATENT OFFICE.

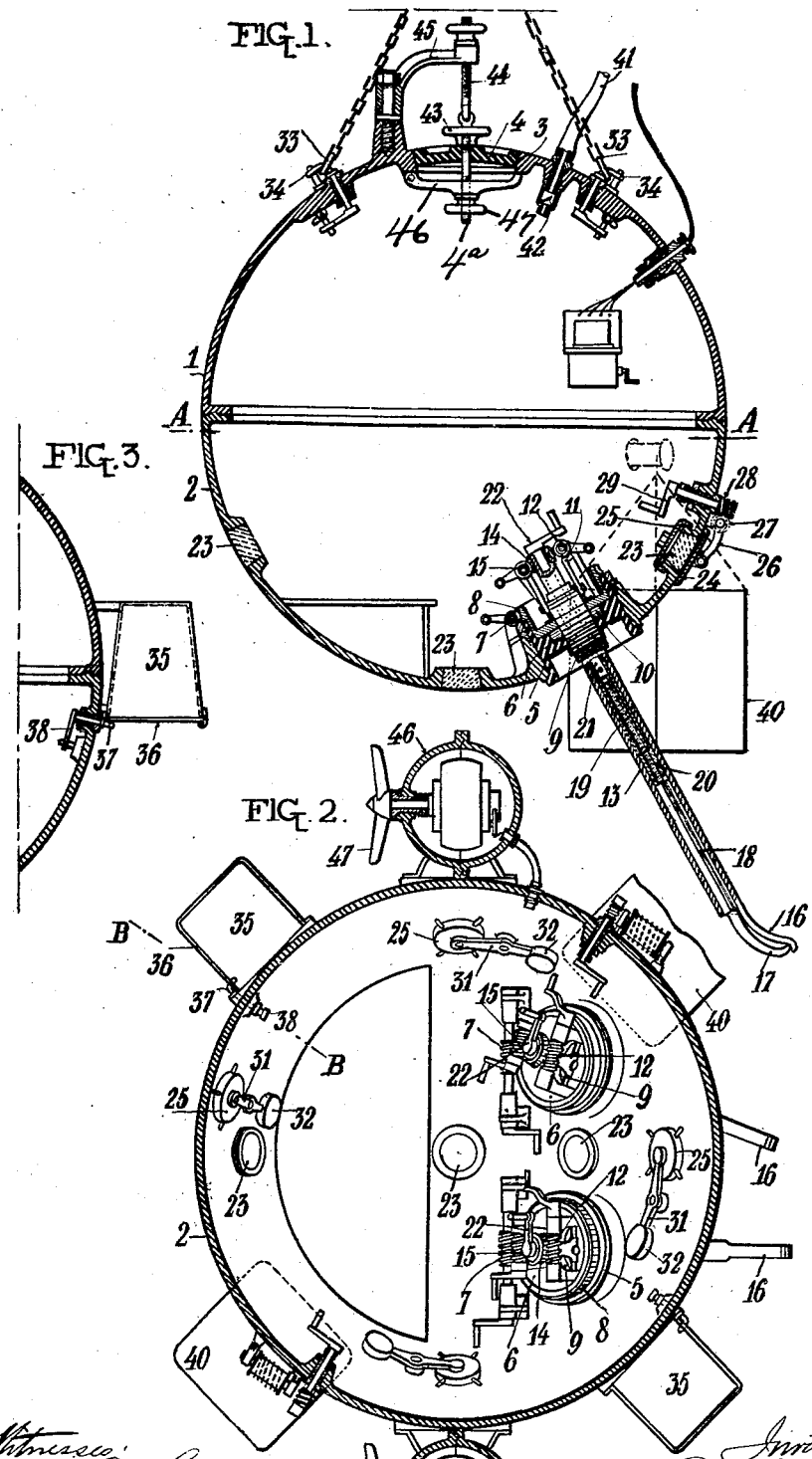

PIERRE EUGÈNE GALOFFRE, OF PARIS, FRANCE.

APPARATUS FOR SUBMARINE OPERATIONS.

935,485.  Specification of Letters Patent. Patented Sept. 28, 1909.

Application filed January 8, 1909. Serial No. 471,362.

*To all whom it may concern:*

Be it known that I, PIERRE EUGÈNE GA-LOFFRE, citizen of the Republic of France, residing at Paris, in France, have invented certain new and useful Apparatus for Submarine Operations, of which the following is a specification.

This invention relates to apparatus for submarine operations and has for its object to provide an arrangement which can be used for investigations and work at a great depth.

According to this invention the apparatus comprises a spherical body provided with devices on its outside for shifting or seizing submerged materials, such devices comprising one or more pairs of pincers or the like capable of being moved in any direction and operated separately or together from within the diving sphere.

In the accompanying drawings which show one form of this apparatus Figure 1 is a vertical sectional elevation, Fig. 2 is a section on the line A—A of Fig. 1, and Fig. 3 is a sectional view of part of the apparatus on the line B—B of Fig. 2.

In the construction shown the apparatus comprises two superimposed semi-spherical shells 1 and 2 connected together in a water tight manner so as to form a complete sphere, to the interior of which access may be had through an opening 3 formed at the top of the upper hemisphere 1 normally closed by means of a plate or cover 4 capable of being opened or closed in an air tight manner either from inside the sphere or from the outside. The man-hole cover 4 is provided with a screw threaded spindle 4ᵃ the upper end of which carries a locking nut 43. The lower or inner end of said spindle extends through a hinged spider 46 and below the latter is provided with a locking nut 47. By manipulating the locking nuts 43 and 47 the man-hole cover can be opened or closed from within the shell or from the exterior thereof.

One of the hemispheres, preferably the lower one 2, is provided near its center with two openings 5 through which pass two pairs of pincers capable of being moved in any direction the special arrangement of which constitutes one of the characteristic features of this invention.

To each of the openings 5 is secured in a fluid tight manner a disk 6 which can be rotated in its respective opening 5 by means of a worm 7 mounted within the sphere and engaging with a worm wheel 8 carried by the disk 6. Through the latter passes at right angles a second disk 9 having central trunnions 10 rotating in bearings formed on the inner surface, or in the thickness of the other disk 6. Mounted within the sphere is a toothed sector 11 with which a worm 12 carried by the disk 6 engages, this sector being connected to the disk 9 which can thus be partially rotated in a direction at right angles to the disk 6 which in its turn can rotate in a plane tangential to the sphere. The openings 5 in which the two disks operate are provided with suitable packings to prevent leakage.

Through the center of the disk 9 in a direction parallel to its face is passed a tube 13 the end of which that lies within the sphere being provided with a worm wheel 14 with which engages a worm 15 supported by the disk 9. By operating the worm 15 it is possible to rotate the tube 13 completely in the disk 9 so that the tube can be arranged in any direction and occupy any desired oblique positions relative to the sphere.

At its outer end, the tube 13 terminates in the jaw 16 of one pair of pincers, the other jaw 17 of which is supported by the end of a polygonal rod 18 capable of sliding within the bore of the tube 13 which is of corresponding cross section. The upper end of the rod 18 is screw threaded as at 19 and engages a tapped nut 20 at the end of a sleeve or socket 21 disposed within the tube 13 so as to rotate but not move axially therein. The said sleeve 21 carries at its end situated within the sphere a crank handle 22 or the like whereby the distance between the ends of the jaws 16 and 17 of the pair of pincers can be varied at will.

With the construction described above it is possible to operate from the interior of the sphere one or more pairs of pincers and manipulate them separately at different points or jointly at one and the same point, according to the work to be performed.

Port holes 23 arranged at suitable points of the lower hemisphere 2 or of that carrying the pincers enable the different working points to be lighted and examined, and these port holes may be closed in case of danger from the outside as well as from the inside by suitable covers. One of such covers is arranged outside and comprises a shutter 24 pivoted at its center to the end of a lever 26 which is operated from inside the sphere and which for that purpose carries on its pivot pin a worm wheel 27 engaging a worm 28, the spindle of which passes through the shell of the sphere and is provided with an operating crank 29. By actuating the crank handle 29 the outer face of the port hole 23 is either opened or closed when it is desired to protect the latter or even to prevent a leak through its joint. The other cover is disposed inside the sphere and comprises a disk 25 pivoted to one of the ends of a balanced lever 31 on the other end of which is a weight 32 which tends to maintain the disk 25 away from its port hole 23. This inner disk forms a cap and is provided with an internal screw thread which enables it if desired to be screwed on the rim of the port hole which is correspondingly screw-threaded.

The apparatus is suspended from the winch or otherwise of a vessel on the surface by means of chains 33 the extreme links of which engage suitable hooks 34 which can be rotated from the interior of the sphere to enable the apparatus to be disengaged from its suspension cable when for any reason the latter breaks or interferes with its movements. In that case the raising of the apparatus to the surface of the water is effected by emptying ballast cases 35 with which the apparatus is provided on its outside at diametrically opposite points. To enable this emptying to take place these cases are each provided with a pivoted base 36 supported at one of its corners by means of a rotatable finger 37 normally held in place by a bolt 38 inside the sphere. When this bolt 38 is released the finger 37 is rotated and the base 36 of the ballast case swings down so as to discharge the contents thereof.

The apparatus is provided at either side at diametrically opposite points with water tight gear cases 46 in which are mounted electric motors operating propellers 47 whereby the apparatus may be driven without external assistance. Suitable weights or anchors 40 suspended to winches also operated from the interior of the apparatus enable the latter to be anchored in a predetermined position and at the desired height above the point to be investigated.

The union of the air supply pipe 41 to the apparatus is provided with an automatic valve 42 which closes the pipe when for any reason water enters the sphere thereby.

The outside locking nut 43 which maintains the screw-threaded spindle of the manhole cover 4 in position is provided with an eye to which is connected a screw threaded rod 44 supported in a pivoted bracket 45 which facilitates the release and operation of the man-hole cover mechanism.

Finally the apparatus is provided with signaling apparatus which may be telegraphic, telephonic or otherwise enabling communication to be established between the crew of the vessel on the surface and those within the sphere.

It will be understood that details of construction may be considerably varied without departing from this invention.

What I claim as my invention and desire to procure by Letters Patent is:—

1. In submarine apparatus the combination of a sphere having a manhole therein, an airtight cover for said manhole, means for supplying air to the interior of the sphere, an inspection window in said sphere, means for lowering the sphere, disengaging mechanism for said lowering means operable from within the sphere, means for maneuvering the sphere and gripping means extending outside the sphere and operable from within the latter as set forth.

2. In submarine apparatus the combination of a sphere having a manhole therein, an airtight cover for said manhole, means for supplying air to the interior of the sphere, an inspection window in said sphere, means for lowering the sphere, disengaging mechanism for said lowering means operable from within the sphere and gripping means extending outside the sphere, operable from within the sphere, and capable of universal movement as set forth.

3. In submarine apparatus the combination of a sphere having a manhole therein, an air tight cover for said manhole, means for supplying air to the interior of the sphere, an inspection window in said sphere, means for lowering the sphere, disengaging mechanism for said lowering means operable from within the sphere and gripping means extending outside the sphere comprising a plurality of pairs of pincers operable from within the sphere and capable of universal movement as set forth.

4. In submarine apparatus the combination of a sphere having a manhole therein, an air tight cover for said manhole, means operable from within and from without the sphere for actuating said cover, means for supplying air to the interior of the sphere an inspection window in the sphere, means for maneuvering the sphere and gripping means extending outside the sphere and operable from within the latter as set forth.

5. In submarine apparatus the combination of a sphere having a manhole therein, an air tight cover for said manhole, means for supplying air to the interior of the sphere, an inspection window in said sphere, ballast containing chambers on the exterior of the sphere, means operable from within the sphere for discharging said ballast, means for propelling said sphere, and gripping means extending outside the sphere, operable from within the latter, and capable of universal movement as set forth.

6. In submarine apparatus the combination of a sphere having a manhole therein, an air tight cover for said manhole means for supplying air to the interior of the sphere an inspection window in said sphere, ballast containing chambers on the exterior of the sphere, means operable from within the sphere for discharging said ballast, means for propelling said sphere, an anchor for the sphere controlled from within the latter, and gripping means extending outside the sphere, operable from within the latter, and capable of universal movement as set forth.

7. In submarine apparatus the combination of a sphere having a manhole therein, an airtight cover for said manhole, means for supplying and controlling the supply of air to the interior of the sphere, means for lowering the sphere, disengaging mechanism for said lowering means operable from within the sphere, a plurality of inspection windows in said sphere, means operable from within the sphere for covering the outer and inner surfaces of said windows in a water tight manner, means for maneuvering the sphere, and gripping means extending outside the sphere, operable from within the latter, and capable of universal movement as set forth.

8. In submarine apparatus the combination of a sphere having a manhole therein, an air tight cover for said manhole, means operable from within and without the sphere for actuating said cover, means for supplying and controlling the supply of air to the interior of the sphere, a plurality of inspection windows in said sphere, means operable from within the sphere for covering the outer and inner surfaces of said windows, means for lowering the sphere, disengaging mechanism for said lowering means operable from within the sphere, ballast containing chambers on the exterior of the sphere, means operable from within the sphere for discharging said ballast, means for propelling said sphere, a plurality of anchors controlled from within the sphere, and gripping means extending outside the sphere each comprising a pair of pincers operable from within the sphere by means of worm gearing and capable of universal movement as set forth.

In testimony whereof I have signed my name to this specification in the presence of two subscribing witnesses.

PIERRE EUGÈNE GALOFFRE.

Witnesses:
 DEAN B. MASON,
 GEORGES BONNEUIL.